Patented Nov. 1, 1932

1,885,641

UNITED STATES PATENT OFFICE

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND

DYESTUFFS CONTAINING METALS AND PROCESS OF MAKING SAME

No Drawing. Application filed May 6, 1929, Serial No. 360,986, and in Switzerland May 10, 1928.

The present invention relates to the manufacture of metal-compounds of ortho-hydroxy-azo-dyestuffs containing several metals. It comprises the process of making these dyestuffs, the dyestuffs themselves, and the material dyed with the new dyestuffs.

In specification Serial No. 283,731 there is described a process of making easily soluble complex chromium compounds by treating the azo-dyestuff which is to be converted into the chromium compound with an agent that yields chromium, which agent may consist itself of an organic chromium salt or of an inorganic chromium salt and an agent adapted to bind acid, adding soluble salts of an aliphatic monocarboxylic acid in such a quantity that after the chroming process is complete the reaction mixture contains soluble salts of an aliphatic monocarboxylic acid.

According to the present invention new dyestuffs containing metals of atomic weight ranging from 48.1 to 63.6 are made by treating the complex chromium compounds, obtainable by the aforesaid process, with one or more compounds adapted to yield another metal or other metals which can form complex cations, such as copper, cobalt, nickel, tungsten, uranium, aluminium, tin titanium or molybdenum, and the like.

The dyestuffs obtainable in this manner contain one or more other metals in addition to chromium. In general, they are distinguished from the complexes of the aforesaid specification which contain only chromium by their considerably enhanced properties of fastness and better solubility.

The present process is particularly valuable for the production of dyestuffs containing metals which dye fast black shades. These products may be used for dyeing fibers of all kinds, and also for coloring varnishes. Among these black dyeing products those are particularly mentioned which derive from the nitrated diazo-compound of 1-amino-2-hydroxynaphthalene-4-sulfonic acid.

The following examples illustrate the invention, the parts being by weight:—

Example 1

A paste prepared of 22 parts of the azo-dyestuff from the nitrated diazo-compound of 1-amino-2-hydroxynaphthalene-4-sulfonic acid and β-naphthol of the formula

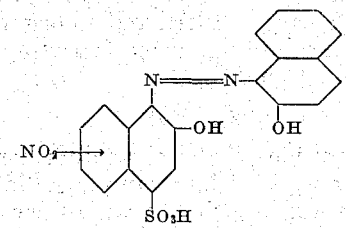

with about 18 parts of water, is finely suspended in a further 300 parts of water and there are added to the suspension 20 parts of crystallized sodium acetate and a solution of 10 parts of chromium formate, corresponding with 4.17 parts of $Cr_2O_3$, in 100 parts of water. The whole is boiled in a reflux apparatus until a dilute sample brought on filter paper shows no color change when dabbed with sodium carbonate, the time required being about 6–8 hours.

The solution obtained as above described is mixed before the salting out operation with a concentrated solution of 25 parts of crystallized copper sulfate of the formula $Cu.SO_4.5H_2O$ and 30 parts of crystallized sodium acetate, and the whole is stirred for 2 hours at 50–60° C. After filtration, the dyestuff is salted out from the filtrate. It is soluble in water to a violet-black solution, in caustic soda solution of 10 per cent. strength to a reddish brown-violet solution and in concentrated sulfuric acid to a blue solution.

A like dyestuff is obtained by mixing the solution of the chromium compound with a concentrated solution of 10 parts of copper sulfate and 10 parts of acetic acid of 10 per cent. strength and then evaporating to dryness at a temperature not exceeding 60° C.

Example 2

A solution of the chromium compound made as described in Example 1, first paragraph, is mixed with about 20 parts of ammonia of 24 per cent. strength and then with an ammoniacal solution of copper oxide containing 25 parts of crystallized copper sulfate 200 parts of water and 60 parts of ammonia of 24 per cent. strength, whereupon the chromium-copper compound of the dyestuff immediately separates. The suspension thus produced is heated on the water-bath for an hour, then cooled to 50° C. and made just acid to Congo by addition of sulfuric acid of 10 per cent. strength. After stirring for about ¼ hour at 50–60° C. dissolution has occurred. After filtration, the dyestuff is salted out from the filtrate. When dry it is a black powder, freely soluble in water to a violet-black solution; in concentrated sulfuric acid to a blue solution and in caustic soda solution of 10 per cent. strength to a reddish brown-violet solution.

Instead of an ammoniacal solution of copper sulfate, copper hydroxide may be used or a copper solution which has been made by action of a caustic alkali and an organic compound containing hydroxyl-groups upon a copper compound.

*Example 3*

The solution of the chromium compound made as described in Example 1, first paragraph, is mixed with 30 parts of crystallized nickel sulfate of the formula $Ni.SO_4.7H_2O$ and 1 part of acetic acid in 200 parts of water. The whole is heated for 3 hours at 60° C., filtered and salted out. The product obtained dissolves in water to a violet black solution, in concentrated sulfuric acid to a blue solution and in caustic soda solution of 10 per cent. strength to a reddish brown-violet solution.

Further valuable products which dye wool black are obtained by using in place of nickel sulfate compounds which yield copper, cobalt, manganese, vanadium or other metals forming complexes, or mixtures of such metals, it being possible to effect the further metallization of the aforesaid complex chromium compounds in an alkaline medium.

*Example 4*

The goods to be dyed are handled for 10–15 minutes at 60° C. in a bath containing 3 per cent. of sulfuric acid of 66° Bé. and there is then added a thoroughly dissolved dyestuff made according to this invention, dyeing being continued for ½ hour at 60° C.; the bath is then gradually heated to the boil, a further 3–5 per cent. of sulfuric acid of 66° Bé. is added and boiling continued for ¼–¾ hour until the dyeing has been fully developed.

*Example 5*

For dyeing 100 parts of ordinary or weighted silk, 2 parts of the dyestuff made as described in Example 1 are dissolved in the necessary quantity of boiling water. This solution and 6–8 parts of acetic acid are added to the dye-bath, the goods are entered at 50–60° C., and the bath is heated gradually to 80° C. and maintained at this temperature ¾–1 hour. After washing, the goods are brightened in the usual manner and dried. The silk is thus dyed fast black tints.

What we claim is:—

1. Process for the manufacture of fast black dyeing metal compounds of azo-dyestuffs containing besides chromium at least one other metal adapted to form complex compounds, consisting in treating the complex chromium compounds obtained by treating ortho-hydroxy-azo-dyestuffs with chromium salts adding soluble salts of an aliphatic monocarboxylic acid in such a quantity that after the chroming process is complete the reaction mixture contains soluble salts of an aliphatic monocarboxylic acid, with at least one compound yielding at least one metal other than chromium adapted to form complex compounds with azo-dyestuffs.

2. Process for the manufacture of fast black dyeing metal compounds of azo-dyestuffs containing besides chromium at least one other metal of the atomic weight ranging between 51.2 to 63.6 adapted to form complex compounds consisting in treating the complex chromium compounds obtained by treating ortho-hydroxy-azo-dyestuffs with chromium salts adding soluble salts of an aliphatic monocarboxylic acid in such a quantity that after the chroming process is complete the reaction mixture contains soluble salts of an aliphatic monocarboxylic acid, with at least one compound yielding at least one metal of the atomic weight ranging between 51.2 to 63.6 other than chromium.

3. Process for the manufacture of fast black dyeing metal compounds of azo-dyestuffs containing besides chromium copper, consisting in treating the complex chromium compounds obtained by treating ortho-hydroxy-azo-dyestuffs with chromium salts adding soluble salts of an aliphatic monocarboxylic acid in such a quantity that after the chroming process is complete the reaction mixture contains soluble salts of an aliphatic monocarboxylic acid, with at least one compound yielding copper.

4. Process for the manufacture of fast black dyeing metal compounds of azo-dyestuffs deriving from diazotized 1-amino-2-hydroxynaphthalene-4-sulfonic acid containing besides chromium copper, consisting in treating the complex chromium compounds obtained by treating ortho-hydroxy-azo-dyestuffs deriving from diazotized 1-amino-2-hydroxynaphthalene-4-sulfonic acid, with chromium salts adding soluble salts of an aliphatic monocarboxylic acid in such a quantity that after the chroming process is complete the reaction mixture contains soluble salts of an aliphatic mono-carboxylic acid, with at least one compound yielding copper.

5. Process for the manufacture of fast black dyeing metal compounds of the azo-dyestuff from the nitrated 1-diazo-2-hydroxynaphthalene-4-sulfonic acid and β-naphthol containing, besides chromium, copper, consisting in treating the complex chromium compounds obtained by treating the azo-dyestuff from the nitrated 1-diazo-2-hydroxynaphthalene-4-sulfonic acid and β-naphthol with chromium salts, adding soluble salts of an aliphatic monocarboxylic acid in such a quantity that after the chroming process is complete the reaction mixture contains soluble salts of an aliphatic monocarboxylic acid, with at least one compound yielding copper.

6. As new products the metal compounds of azo-dyestuffs containing several metals forming complex compounds, and which are obtained by treating the complex chromium compounds obtained by treating ortho-hydroxy-azo-dyestuffs with chromium salts, adding soluble salts of an aliphatic monocarboxylic acid in such a quantity that after the chroming process is complete the reaction mixture contains soluble salts of an aliphatic monocarboxylic acid, with at least one compound yielding at least one metal other than chromium adapted to form complex compounds with azo-dyestuffs, which products form black powders, dissolving in a dilute solution of sodium carbonate to violet-black to red-brown-violet solutions and in concentrated sulfuric acid to blue solutions, and dyeing wool fast black tints.

7. As new products the metal compounds of azo-dyestuffs containing several metals of the atomic weight ranging between 51.2 to 63.6 forming complex compounds, and which are obtained by treating the complex chromium compounds obtained by treating ortho-hydroxy-azo-dyestuffs with chromium salts, adding soluble salts of an aliphatic monocarboxylic acid in such a quantity that after the chroming process is complete the reaction mixture contains soluble salts of an aliphatic monocarboxylic acid, with at least one compound yielding at least one metal of the atomic weight ranging between 51.2 to 63.6 other than chromium, which products form black powders, dissolving in a dilute solution of sodium carbonate to violet-black to red-brown-violet solutions and in concentrated sulfuric acid to blue solutions, and dyeing wool fast black tints.

8. As new products the metal compounds of azo-dyestuffs containing chromium and copper, and which are obtained by treating the complex chromium compounds obtained by treating ortho-hydroxy-azo-dyestuffs with chromium salts, adding soluble salts of an aliphatic monocarboxylic acid in such a quantity that after the chroming process is complete the reaction mixture contains soluble salts of an aliphatic monocarboxylic acid, with at least one compound yielding copper, which products form black powders, dissolving in a dilute solution of sodium carbonate to violet-black to red-brown-violet solutions and in concentrated sulfuric acid to blue solutions, and dyeing wool fast black tints.

9. As new products the metal compounds of azo-dyestuffs deriving from 1-amino-2-hydroxynaphthalene-4-sulfonic acid containing chromium and copper, and which are obtained by treating the complex chromium compounds obtained by treating ortho-hydroxy-azo-dyestuffs deriving from diazotized 1-amino-2-hydroxynaphthalene-4-sulfonic acid, with chromium salts, adding soluble salts of an aliphatic monocarboxylic acid in such a quantity that after the chroming process is complete the reaction mixture contains soluble salts of an aliphatic monocarboxylic acid, with at least one compound yielding copper, which products form black powders, dissolving in a dilute solution of sodium carbonate to violet-black to red-brown-violet solutions and in concentrated sulfuric acid to blue solutions, and dyeing wool fast black tints.

10. As a new product the metal compound of the azo-dyestuff from the nitrated 1-diazo-2-hydroxynaphthalene-4-sulfonic acid and β-naphthol containing chromium and copper, which is obtained by treating the complex chromium compound obtained by treating this ortho-hydroxy-azo-dyestuff with chromium salts, adding soluble salts of an aliphatic monocarboxylic acid in such a quantity that after the chroming process is complete the reaction mixture contains soluble salts of an aliphatic monocarboxylic acid, with at least one compound yielding copper, which product forms a black powder, dissolving in a dilute solution of sodium carbonate to red-brown-violet solutions and in concentrated sulfuric acid to blue solutions, and dyeing wool fast black tints.

In witness whereof we have hereunto signed our names this 25th day of April, 1929.

FRITZ STRAUB.
HERMANN SCHNEIDER.